US008641302B2

(12) United States Patent
Kao et al.

(10) Patent No.: US 8,641,302 B2
(45) Date of Patent: Feb. 4, 2014

(54) CAMERA ROTATION MECHANISM AND PORTABLE ELECTRONIC APPARATUS THEREWITH

(75) Inventors: San-Pao Kao, New Taipei (TW); Cheng-Hsiang Chuang, New Taipei (TW); Chen-Yi Liang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/480,448

(22) Filed: May 24, 2012

(65) Prior Publication Data
US 2013/0064537 A1    Mar. 14, 2013

(30) Foreign Application Priority Data
Sep. 13, 2011    (TW) .............................. 100132845 A

(51) Int. Cl.
*G03B 17/00*    (2006.01)
(52) U.S. Cl.
USPC ........................................................ 396/428
(58) Field of Classification Search
USPC ........................................................ 396/428
See application file for complete search history.

(56) References Cited

U.S. PATENT DOCUMENTS

| | | | | |
|---|---|---|---|---|
| 5,903,706 A | * | 5/1999 | Wakabayashi et al. | 386/224 |
| 5,907,730 A | * | 5/1999 | Tseng et al. | 396/428 |
| 8,317,415 B2 | * | 11/2012 | Chang | 396/428 |
| 2013/0064537 A1 | * | 3/2013 | Kao et al. | 396/428 |

FOREIGN PATENT DOCUMENTS

| | | |
|---|---|---|
| TW | 200600944 | 1/2006 |
| TW | 201003275 | 1/2010 |

OTHER PUBLICATIONS

Office action mailed on Sep. 6, 2013 for the Taiwan application No. 100132845, filed: Sep. 13, 2011, p. 1 line 12~14, p. 2~4 and p. 5 line 1~10.

* cited by examiner

*Primary Examiner* — W B Perkey
(74) *Attorney, Agent, or Firm* — Winston Hsu; Scott Margo

(57) ABSTRACT

The invention discloses a camera rotation mechanism and a portable electronic apparatus therewith. The camera rotation mechanism includes a rotatable carrier, a bearing structure, and a rotating mechanism, which are disposed in a casing. The rotatable carrier includes a carrier body and a rotatable shaft connected to the carrier body and bore by the bearing structure. A camera module is disposed on the carrier body such that a lens of the camera module is exposed through a lens hole of the casing. The rotating mechanism is connected to the rotatable shaft and includes a rotation operation part partially exposed through a slot hole of the casing and capable of being rotated to rotate the carrier body through the rotatable shaft. Therefore, a user can use the camera rotation mechanism to adjust the disposition angle of the lens, which solves the impossibility of adjusting a fixed camera in the prior art.

20 Claims, 7 Drawing Sheets

CAMERA ROTATION MECHANISM AND PORTABLE ELECTRONIC APPARATUS THEREWITH

BACKGROUND OF THE INVENTION

1. Field of the Invention

The invention relates to a camera-supporting structure and a portable electronic apparatus, and especially relates to a rotatable camera-supporting structure and a portable electronic apparatus therewith.

2. Description of the Prior Art

Most current notebooks have built-in cameras. The camera is mounted in the casing of the notebook. The lens of the camera is exposed through a hole formed on the casing so as to capture images. Because the camera is disposed fixedly, the angle of the camera cannot be adjusted unless the camera moves together with the casing. Hence, in practice, a user needs to rotate the casing of the notebook or move his body for obtaining a required capturing angle, which is quite inconvenient to use the camera. Furthermore, the camera is usually disposed near the screen of the notebook, so rotating the casing or moving the user's body also changes the view angle of the user to the screen, which is also inconvenient for the user to view the screen or operate the notebook. Therefore, the camera disposition of the current notebook is not conducive to the adjustment in the angle of the camera, cannot take the consideration for both the camera angle and the screen angle, and even makes the user operation the notebook in an unnatural pose. In addition, the upper casing of the current notebook where the camera is disposed deforms elastically during rotating, so it is hard to rotate the casing once to the position in accordance with the required angle of the camera, which adds trouble to the adjustment.

SUMMARY OF THE INVENTION

An objective of the invention is to provide a camera rotation mechanism. A user can use the camera rotation mechanism to adjust the angle of the lens of a camera module disposed thereon without rotating the whole casing, which solves the inconvenience of adjusting the camera angle in the prior art and the user's unnatural pose due to the adjusting.

The camera rotation mechanism of the invention is disposed in a casing of an electronic apparatus for rotating a camera module. The casing has a slot hole and a lens hole. The camera rotation mechanism includes a rotatable carrier, a bearing structure, and a rotating mechanism. The rotatable carrier is disposed in the casing and includes a carrier body and a rotatable shaft. The rotatable shaft is connected to the carrier body. The camera module is disposed on the carrier body such that a lens of the camera module is exposed through the lens hole. The bearing structure is mounted in the casing and bears the rotatable shaft. The rotating mechanism is connected to the rotatable shaft and includes a rotation operation part. The rotation operation part is partially exposed through the slot hole and capable of being rotated to rotate the carrier body through the rotatable shaft. Thereby, a user can rotate the rotation operation part to adjust the angle of the lens without rotating the whole casing, which is convenient for the user to adjust. Furthermore, in the above adjusting, the casing need not be moved or rotated so that the relative position of the user and the casing remains unchanged; therefore, the user can operate the electronic apparatus in a comfortable pose.

Another objective of the invention is to provide a portable electronic apparatus having the camera rotation mechanism of the invention. Therefore, the portable electronic apparatus also can provide the convenience of adjusting the angle of a lens of a camera module of the portable electronic apparatus to a user, which solves the inconvenience of adjusting the camera angle in the prior art and the user's unnatural pose due to the adjusting.

The portable electronic apparatus of the invention includes a casing, a rotatable carrier, a camera module, a bearing structure, and a rotating mechanism. The casing has a slot hole and a lens hole. The rotatable carrier is disposed in the casing and includes a carrier body and a rotatable shaft. The rotatable shaft is connected to the carrier body. The camera module is disposed on the carrier body and includes a lens. The lens is exposed through the lens hole. The bearing structure is mounted in the casing and bears the rotatable shaft. The rotating mechanism is connected to the rotatable shaft and includes a rotation operation part. The rotation operation part is partially exposed through the slot hole and capable of being rotated to rotate the carrier body through the rotatable shaft. Similarly, a user can rotate the rotation operation part to adjust the angle of the lens without rotating the whole casing, so as to keep the relative position of the user and the casing unchanged for operating the portable electronic apparatus in a comfortable pose.

These and other objectives of the invention will no doubt become obvious to those of ordinary skill in the art after reading the following detailed description of the preferred embodiment that is illustrated in the various figures and drawings.

DETAILED DESCRIPTION

Figure 1:
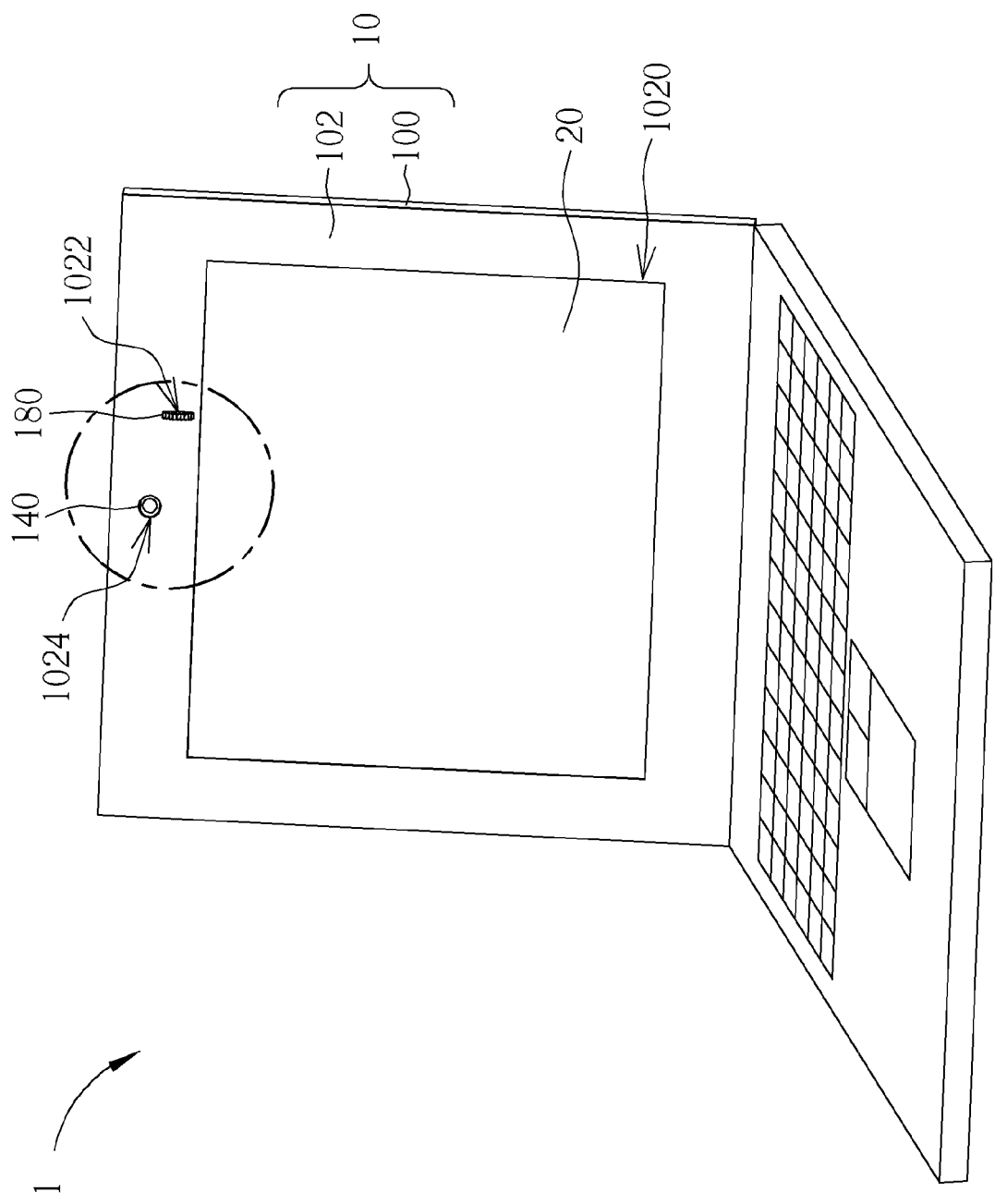
FIG. 1 is a schematic diagram illustrating a sectional view of a portable electronic apparatus of a first preferred embodiment according to the invention.
Figure 2:
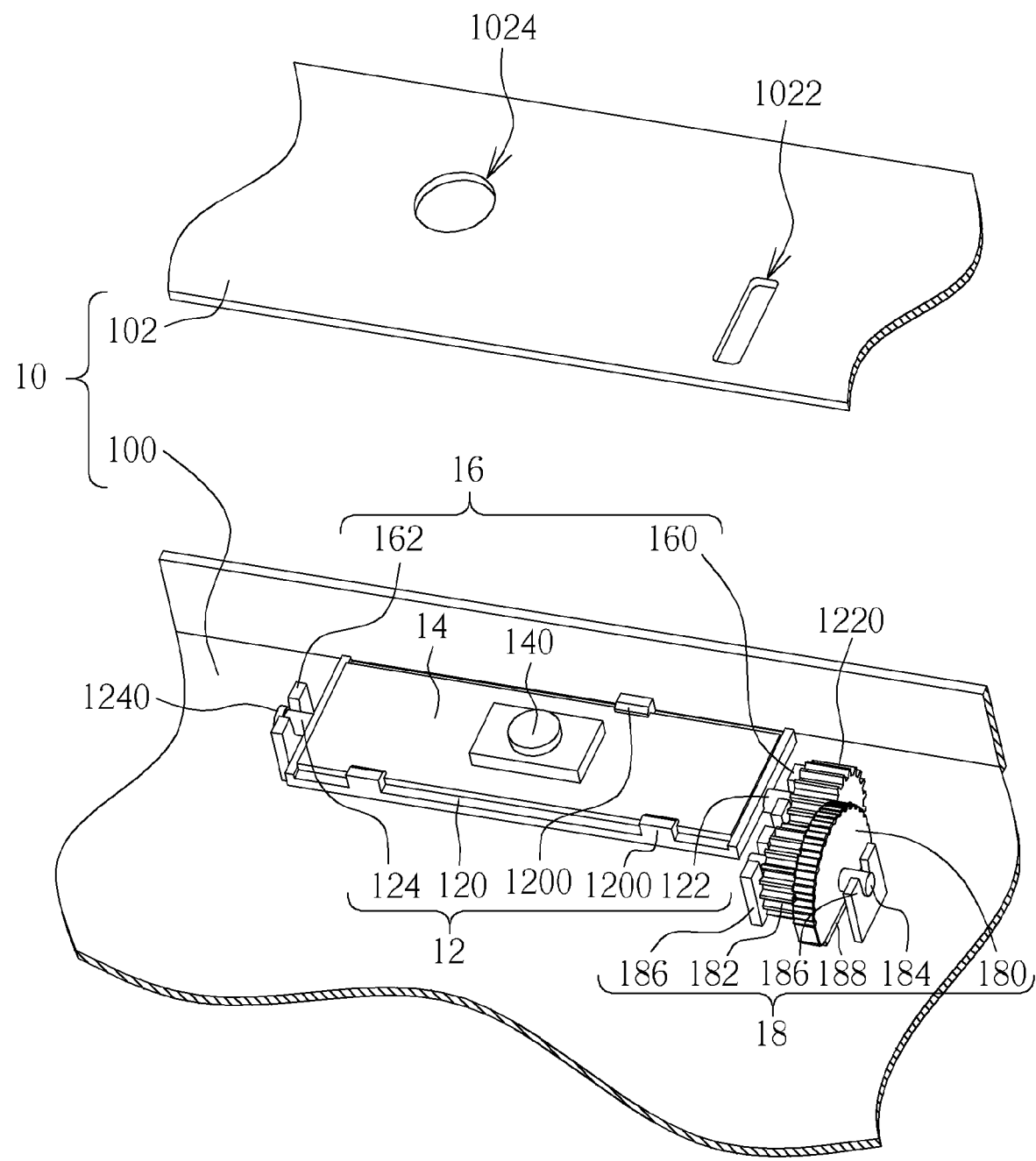
FIG. 2 is a partially exploded view of the portable electronic apparatus in FIG. 1.

Please refer to FIG. 1 and FIG. 2. FIG. 1 is a schematic diagram illustrating a sectional view of a portable electronic apparatus 1 of a first preferred embodiment according to the invention. FIG. 2 is a partially exploded view of the portable electronic apparatus 1 in FIG. 1. In the first preferred embodiment, the portable electronic apparatus 1 is a notebook; however, the invention is not limited thereto. For example, cellular phones, tablet computers and the like are also applicable. The portable electronic apparatus 1 includes an upper casing 10, a rotatable carrier 12, a camera module 14, a bearing structure 16, a rotating mechanism 18, and a screen 20; therein, the rotatable carrier 12, the bearing structure 16, and the rotating mechanism 18 composes the camera rotation mechanism of the portable electronic apparatus 1. The upper casing 10 includes a back cover 100 and a front cover 102. The back cover 100 and the front cover 102 are connected to form an accommodating space for accommodating the above components. The front cover 102 forms a window 1020 at the middle portion thereof and forms a slot hole 1022 and a lens hole 1024 at a margin portion thereof. The camera module 14 is capable of being exposed through the lens hole 1024. The rotating mechanism 18 is capable of being exposed through the slot hole 1022. The screen 20 is capable of being exposed through the window 1020. Thereby, a user can adjust the disposition angle of the camera module 14 by operating the rotating mechanism 18 without moving or rotating the whole upper casing 10.

Figure 3:
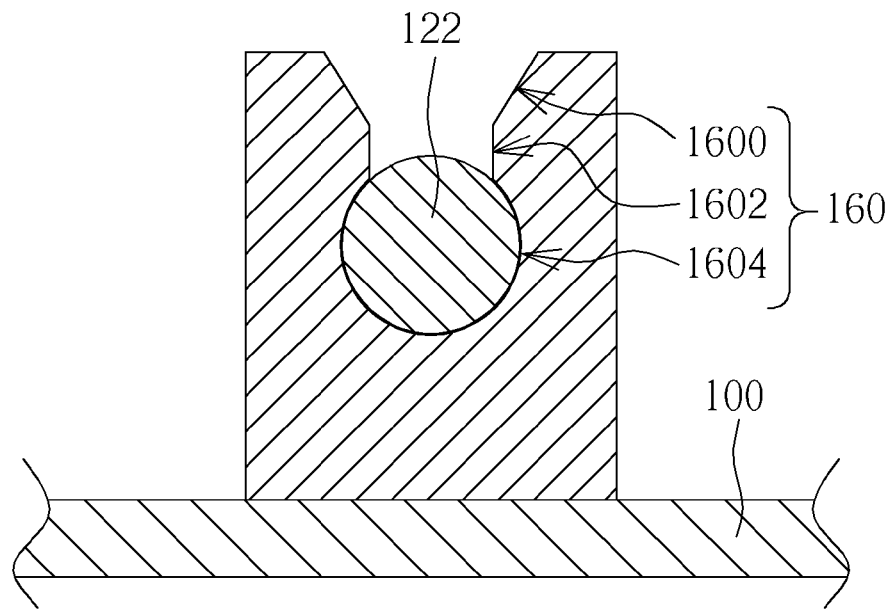
FIG. 3 is a sectional view of the assembly of the first bearing support and the first rotatable shaft in FIG. 2.

For further details, the bearing structure 16 includes a first bearing support 160 and a second bearing support 162, mounted on the back cover 100. The rotatable carrier 12 is disposed in the upper casing 10 and includes a carrier body 120, a first rotatable shaft 122 and a second rotatable shaft 124. The first rotatable shaft 122 and the second rotatable shaft 124 are disposed oppositely and connected to the carrier body 120 so as to be capable of being rotated together with the carrier body 120. The first bearing support 160 bears the first rotatable shaft 122; the second bearing 1 support 162 bears the second rotatable shaft 124. The camera module 14 is dispose don the carrier body 120 such that a lens 140 of the camera module 14 is exposed through the lens hole 1024. In the first embodiment, the carrier body 120 includes a plurality of hooks 1200 for holding the camera module 14; however, the invention is not limited thereto. Furthermore, the first bearing support 160 has an opening portion 1600, a neck portion 1602, and an accommodating portion 1604. The first rotatable shaft 122 can be past through the neck portion 1602 from the opening portion 1600 to be contained in the accommodating portion 1604. The sectional view of the both after assembled is shown as FIG. 3. The assembly mechanism for the second bearing support 162 is similar and is not described herein. Thereby, the carrier body 120 can be rotated to adjust the disposition angle of the lens 140. It is added that, in the first embodiment, the opening portion 1600, the neck portion 1602, and the accommodating portion 1604 are embodied by a C-shaped structure, but the invention is not limited thereto.

Figure 4:
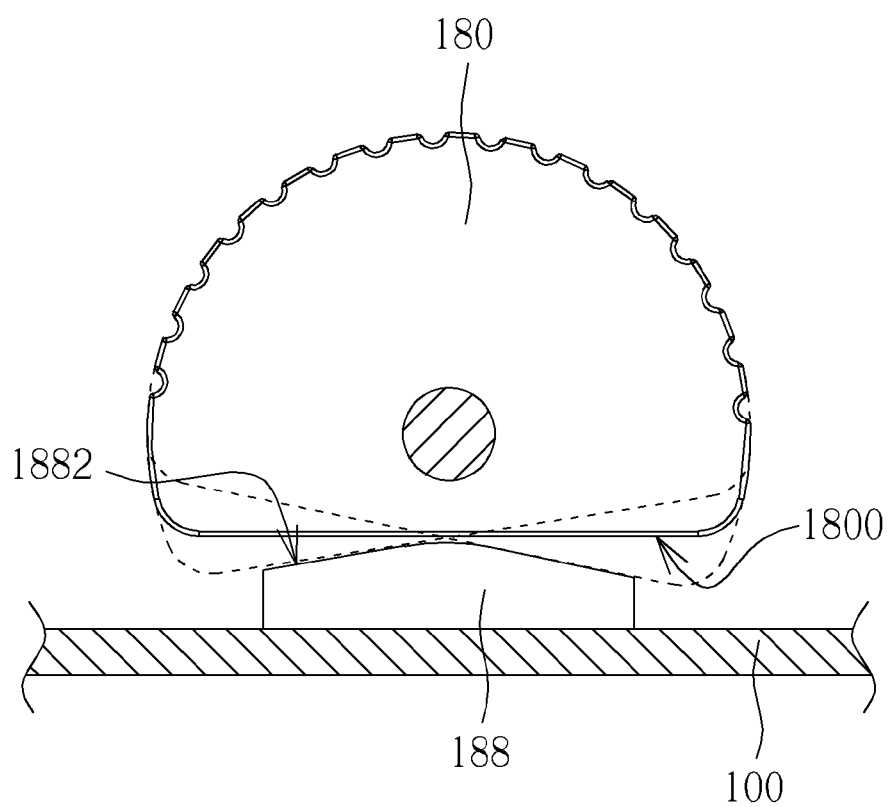
FIG. 4 is a side view of the disposition configuration of the limit structure and the rotation operation part in FIG. 2.

In addition, the first rotatable shaft 122 includes a first gear 1220. The rotating mechanism 18 includes a rotation operation part 180, a second gear 182, a rotatable shaft 184, and a bearing structure 186. The bearing structure 186 consists mainly of two bearing supports for bearing the rotatable shaft 184. In the first embodiment, the bearing support of the bearing structure 186 is equivalent to that of the first bearing support 160 and is not described herein. However, in practice, the invention is not limited thereto. The rotation operation part 180 and the second gear 182 are connected fixedly to the rotatable shaft 184 so as to be rotated relative to the back cover 100 through the rotatable shaft 184. The second gear 182 is meshed with the first gear 1220 so that the rotating mechanism 18 is connected to the first rotatable shaft 122. The rotation operation part 180 is partially exposed through the slot hole 1022 and is capable of being rotated to rotate the carrier body 120 through the second gear 182 and the first gear 1220 so as to adjust the lens 140. In the first embodiment, the exposed portion of the rotation operation part 180 thereon forms a teeth structure for a user to rotate the rotation operation part 180; however, the invention is not limited thereto. In addition, in order to prevent the carrier body 120 from being over-rotated to damage components, as shown in FIG. 4, in the first embodiment, the rotating mechanism 18 also includes a limit structure 188 mounted on the back cover 100. The rotation operation part 180 includes a stop surface 1800 corresponding to the limit structure 188. In the first embodiment, the limit structure 188 has a reverse-V contact surface 1882 corresponding to the stop surface 1800 for providing a larger contact area to the stop surface so as to perform a more stable constraint. In this case, when rotation operation part 180 is rotated to a certain angle (shown by dashed lines), the reverse-V contact surface 1882 of the limit structure 188 contacts and stops the stop surface 1800 to prevent further rotation by the rotation operation part 180, so as to obtain the purpose of constraining the rotation angle range of the rotation operation part 180.

It is added that, referring to FIG. 2, in the first embodiment, in order to prevent the carrier body 120 from sliding left and right excessively leading to the lens 140 sliding out of the range of the lens hole 1024, the first gear 1220 is disposed adjacent to the first bearing support 160 and the second rotatable shaft 124 includes a protrusive ring 1240 adjacent to the second bearing support 162, so as to keep the first rotatable shaft 122 and the second rotatable shaft 124 be bore stably by the first bearing support 160 and the second bearing support 162 and to prevent the carrier body 120 from sliding left and right excessively. In practice, the above mechanism of preventing the carrier body 120 from sliding can be performed alternatively by directly disposing the first bearing support 160 and the second bearing support 162 adjacent to the carrier body 120; however, the invention is not limited thereto.

Figure 5:
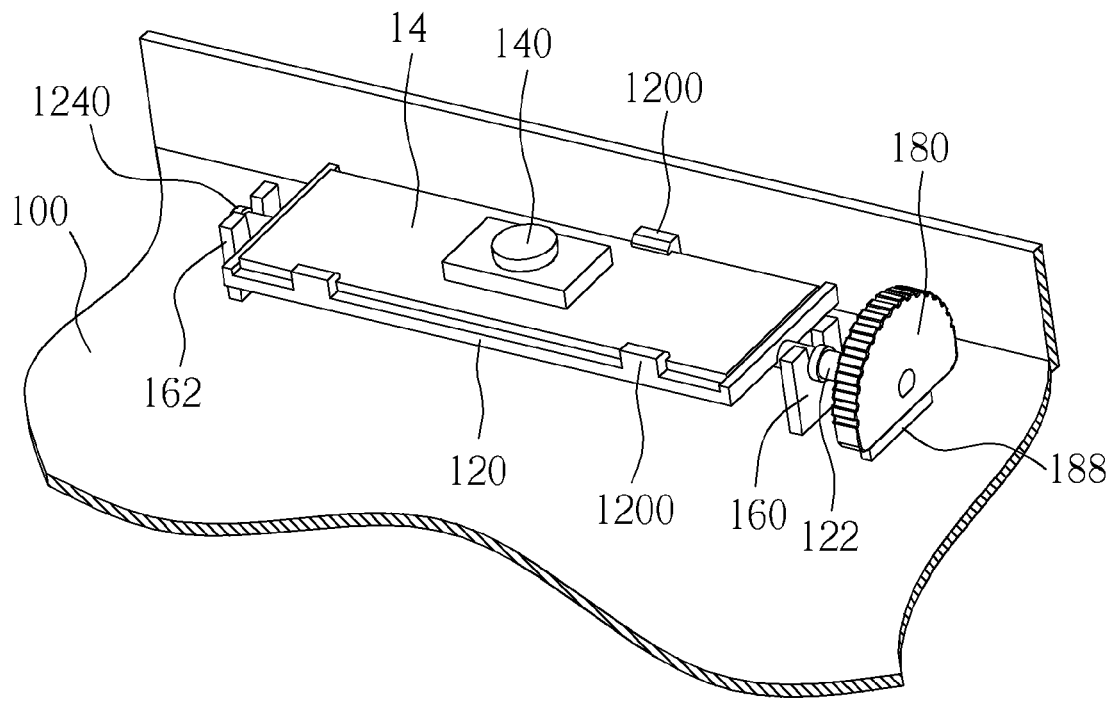
FIG. 5 is a schematic diagram illustrating a camera rotation mechanism of a second preferred embodiment according to the invention.
Figure 6:
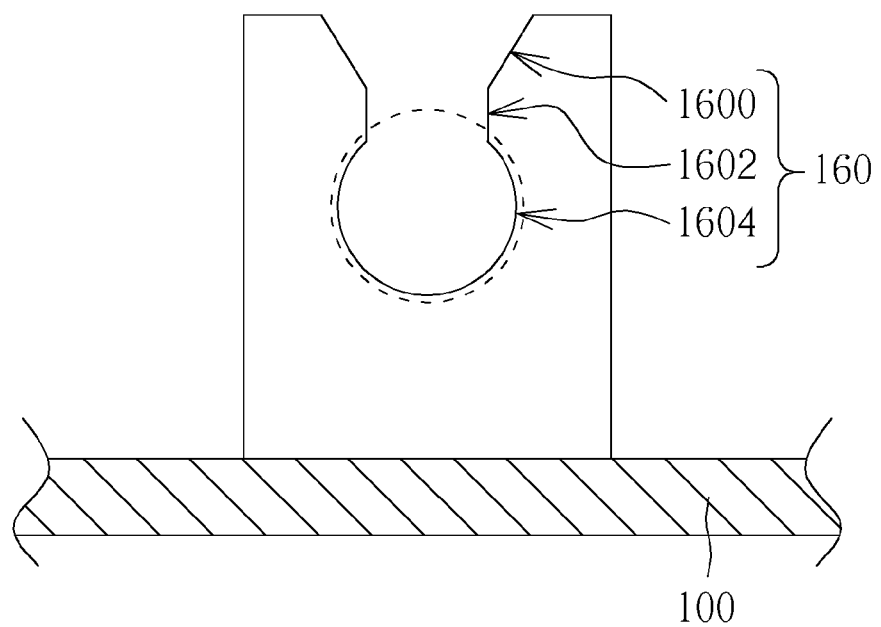
FIG. 6 is a sectional view of the first bearing support in FIG. 5.

Please refer to FIG. 5, which is a schematic diagram illustrating a camera rotation mechanism of a second preferred embodiment according to the invention. The camera rotation mechanism in FIG. 5 can replace the camera rotation mechanism of the portable electronic apparatus 1. In the second embodiment, the camera rotation mechanism in FIG. 5 is substantially similar in structure to the camera rotation mechanism in FIG. 2. The main difference is that the rotation operation part 180 of the camera rotation mechanism in FIG. 5 is fixed connected directly to the first rotatable shaft 122, not through the first gear 1220 and the second gear 182. Similarly, the carrier body 120 can be rotated through the first rotatable shaft 122 by rotting the rotation operation part 180. In addition, because of the meshing properties of gears, in the camera rotation mechanism in FIG. 2, any slight shaking cannot induce rotation of the carrier body 120; that is, a set disposition angle of the lens 140 will not be changed under a movement of the portable electronic apparatus 1. In the camera rotation mechanism in FIG. 5, before the first rotatable shaft 122 is assembled to the first bearing support 160, the diameter of the accommodating portion 1604 of the first bearing support 160 is smaller than that of the first rotatable shaft 122, as shown in FIG. 6; therein, the diameter of the first rotatable shaft 122 is shown by a dashed circle. Therefore, the first rotatable shaft 122 is clamped in the accommodating portion 1604 after assembled thereto; that is, the friction produced by the first bearing support 160 to the first rotatable shaft 122 can resist rotation of the carrier body 120 due to any slight shaking. In the camera rotation mechanism in FIG. 5, the second bearing support 162 can be designed in the same structure as the first bearing support 160; however, the invention is not limited thereto. For other descriptions for the components of the camera rotation mechanism in FIG. 5, please refer to relative descriptions in the first embodiment. In addition, it is added that because the disposition position of the rotation operation part 180 in FIG. 5 is different to that of the rotation operation part 180 in FIG. 2, when the camera rotation mechanism in FIG. 5 is applied, the position of the slot hole 1022 of the front cover 102 needs to be adjusted accordingly, which is no long described herein.

Figure 7:
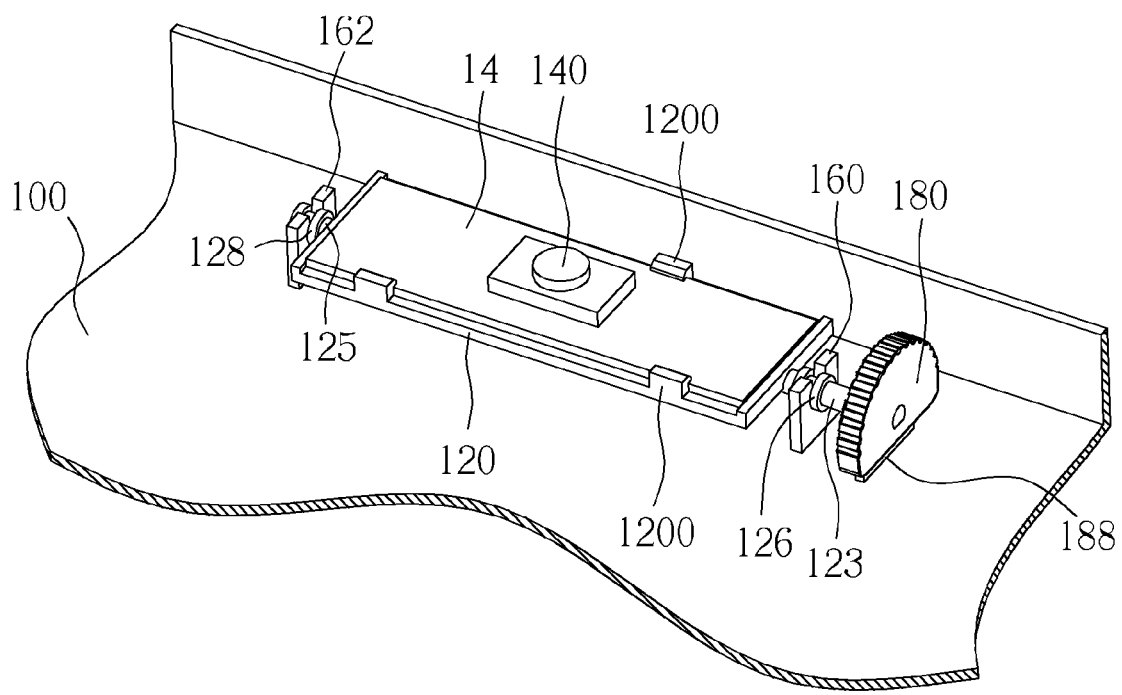
FIG. 7 is a schematic diagram illustrating a camera rotation mechanism of a third preferred embodiment according to the invention.
Figure 8:
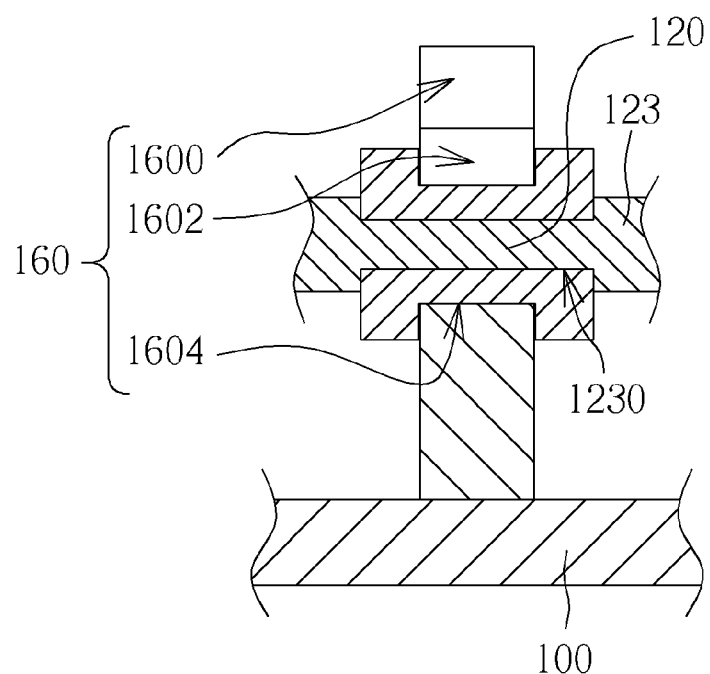
FIG. 8 is a sectional view of the disposition configuration of the first bearing support, the first rotatable shaft, and the rubber sleeve in FIG. 7.

Please refer to FIG. 7, which is a schematic diagram illustrating a camera rotation mechanism of a third preferred embodiment according to the invention. The camera rotation mechanism in FIG. 7 also can replace the camera rotation mechanism of the portable electronic apparatus 1. In the third embodiment, the camera rotation mechanism in FIG. 7 is substantially similar in structure to the camera rotation mechanism in FIG. 5. The main difference is that the rotatable carrier 12 of the camera rotation mechanism in FIG. 7 includes a rubber sleeve 126 sleeved on the first rotatable shaft 123 and held in the accommodating portion 1604 of the first bearing support 160. Please refer to FIG. 8. The first rotatable shaft 123 has a recess 1230 where the rubber sleeve 126 is disposed. The rubber sleeve 126 includes two protrusive rings at its two sides, which are located at the two sides of the accommodating portion 1604. Therefore, the rubber sleeve 126 has a function of positioning the first rotatable shaft 123; however, the invention is not limited thereto. In the third embodiment, the rotation of the carrier body 120 possibly due to any slight shaking can be resisted by use of the property that the rubber sleeve 126 is capable of producing friction. In practice, the rubber sleeve 126 can close fit with the first rotatable shaft 123 such that the rubber sleeve 126 is capable of rotating together with the first rotatable shaft 123; therein, the friction is produced between the rubber sleeve 126 and the first bearing support 160. Alternatively, the rubber sleeve 126 can close fit with the first bearing support 160 such that the rubber sleeve 126 is not to be rotated together with the first rotatable shaft 123; therein, the friction is produced between the rubber sleeve 126 and the first rotatable shaft 123. In the former case, the protrusive rings at the two sides of the rubber sleeve 126 can also be designed to be close to the first bearing support 160, so as to increase the above-mentioned friction. For other descriptions for the components of the camera rotation mechanism in FIG. 7, please refer to relative descriptions in the above embodiments. It is added that, in the third embodiment, the rotatable carrier 12 also includes another rubber sleeve 128 sleeved on the second rotatable shaft 125 and held by the second bearing support 162, of which the description is similar to the foregoing and is no longer described herein. But the invention is not limited thereto.

Figure 9:
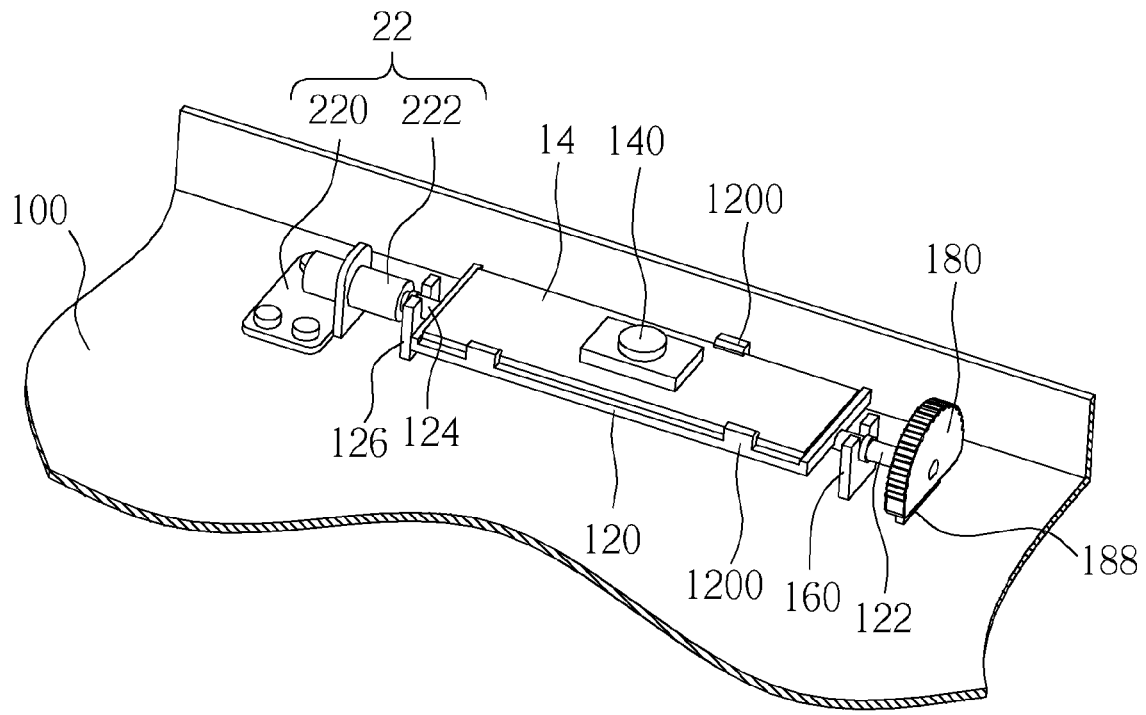
FIG. 9 is a schematic diagram illustrating a camera rotation mechanism of a fourth preferred embodiment according to the invention.
Figure 10:
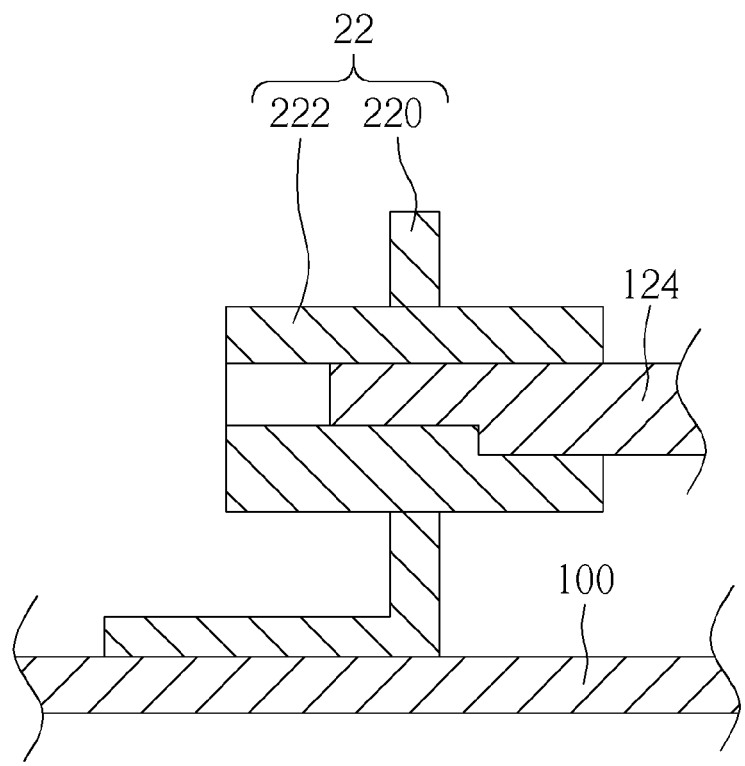
FIG. 10 is a sectional view of the disposition configuration of the friction hinge and the second rotatable shaft in FIG. 9.

Please refer to FIG. 9, which is a schematic diagram illustrating a camera rotation mechanism of a fourth preferred embodiment according to the invention. The camera rotation mechanism in FIG. 9 also can replace the camera rotation mechanism of the portable electronic apparatus 1. In the fourth embodiment, the camera rotation mechanism in FIG. 9 is substantially similar in structure to the camera rotation mechanism in FIG. 5. The main difference is that the camera rotation mechanism in FIG. 9 further includes a friction hinge 22 mounted on the back cover 100. Please also refer to FIG. 10. In the fourth embodiment, the friction hinge 22 includes a support 220 and a sleeve 222. The second rotatable shaft 124 is held in the sleeve 222. The sleeve 222 is capable of being rotated relatively to the support 220 to produce a friction between the sleeve 222 and the support 220 to resist the rotation of the carrier body 120 possibly due to any slight shaking. In practice, the structure of the friction hinge 22 is not limited to that in FIG. 10; any structure design capable of producing friction directly or indirectly on the second rotatable shaft 124 can implement the friction hinge of the invention. For other descriptions for the components of the camera rotation mechanism in FIG. 9, please refer to relative descriptions in the above embodiments.

Figure 11:
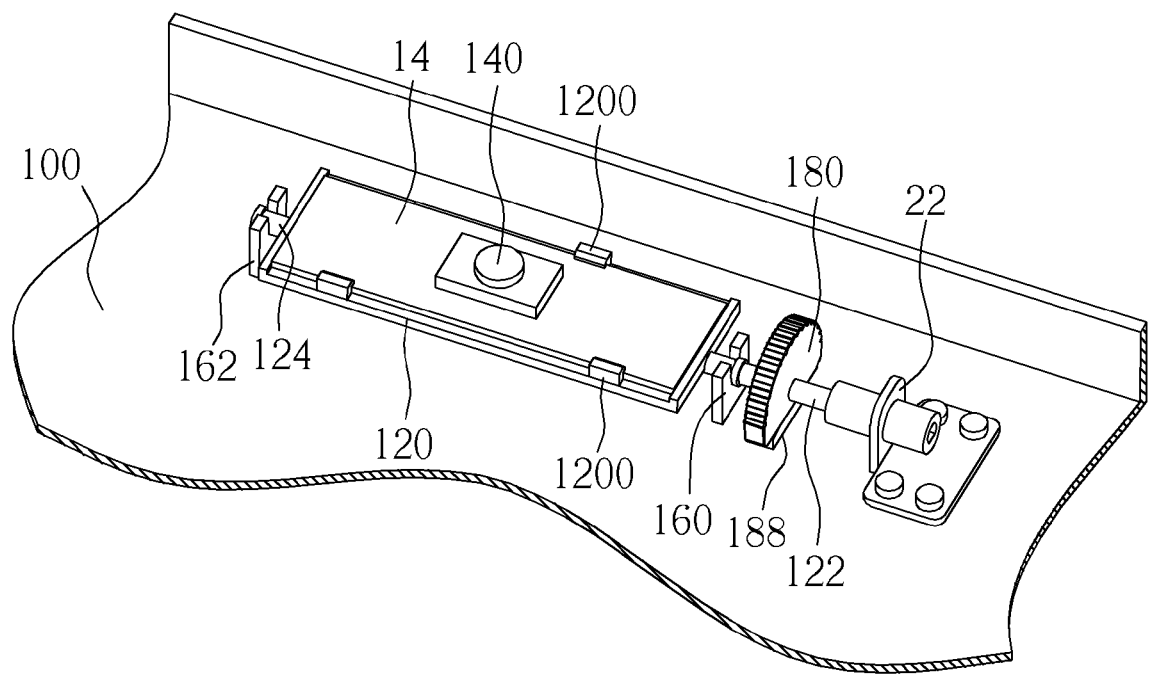
FIG. 11 is a schematic diagram illustrating a camera rotation mechanism of a fifth preferred embodiment according to the invention.

Please refer to FIG. 11, which is a schematic diagram illustrating a camera rotation mechanism of a fifth preferred embodiment according to the invention. The camera rotation mechanism in FIG. 11 also can replace the camera rotation mechanism of the portable electronic apparatus 1. In the third embodiment, the camera rotation mechanism in FIG. 11 is substantially similar in structure to the camera rotation mechanism in FIG. 9. The main difference is that the friction hinge 22 of the camera rotation mechanism in FIG. 11 is connected to the first rotatable shaft 122; similarly, the friction hinge 22 is capable of producing a friction on the first rotatable shaft 122 to resist the rotation of the carrier body 120 possibly due to any slight shaking. In addition, in the fifth embodiment, the friction hinge 22 is close to the rotation operation part 180, so when a user rotates the rotation operation part 180, the torsion and deformation induced in the second rotatable shaft 124, the carrier body 120, and the portion of the first rotatable shaft 122 close to the carrier body 120 can be reduced greatly, so as to improve the adjustment precision and extend the service life. For other descriptions for the components of the camera rotation mechanism in FIG. 11, please refer to relative descriptions in the above embodiments.

It is added that, in the portable electronic apparatus 1 in FIG. 2, the rotation of the carrier body 120 due to any slight shaking can be resisted by the meshing properties of gears, but the way of using friction also can be applied to the portable electronic apparatus 1 in FIG. 2 for further enhancing the effect of resisting shaking. Furthermore, in the above embodiments, the lens hole 1024 is disposed close to the window 1020 of the screen 20; however, the invention is not limited thereto. For example, the invention also can be applied to an electronic apparatus without a screen but a camera. In addition, the camera rotation mechanism of the invention can be applied not only to portable electronic apparatuses but also to fixed electronic apparatuses, even to a fixed casing with a camera.

As discussed above, a user can easily adjust the disposition angle of the lens 140 of the camera module 14 by use of the camera rotation mechanism of the invention without moving the whole upper casing 10; the adjustment precision. Of the lens 140 is therefore improved. Furthermore, because the disposition angles of the lens 140 and the upper casing 10 can be adjusted respectively, the view angle of the user to the screen 20 is not affected by the adjustment to the lens 140, which solves the problem that the user needs to pose unnaturally for operation after adjusting the camera in the prior art. In sum, the camera rotation mechanism and the portable electronic apparatus of the invention provide the adjustment mechanism which is convenient for the user to adjust the disposition angle of the lens and takes the consideration for both the camera angle and the screen angle, so as to overcome the dilemma over taking the consideration for the camera angle or the screen angle in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera rotation mechanism, disposed in a casing of an electronic apparatus for rotating a camera module with a lens, the casing having a slot hole and a lens hole, the camera rotation mechanism comprising:
    a rotatable carrier, disposed in the casing, the rotatable carrier having a carrier body and a first rotatable shaft connected to the carrier body, the camera module being disposed on the carrier body such that the lens of the camera module is exposed through the lens hole;
    a bearing structure, mounted in the casing to bear the first rotatable shaft; and
    a rotating mechanism, connected to the first rotatable shaft, the rotating mechanism having a rotation operation part and a limit structure, the rotation operation part being partially exposed through the slot hole and being capable of being rotated to rotate the carrier body through the first rotatable shaft, the rotation operation part having a stop surface, the limit structure being mounted in the casing corresponding to the stop surface for stopping the stop surface to constrain a rotation angle range of the rotation operation part.

2. The camera rotation mechanism of claim 1, wherein the first rotatable shaft comprises a first gear, the rotating mechanism comprises a second gear mounted on the rotation operation part and meshed with the first gear, and the rotation operation part is capable of being rotated to rotate the carrier body through the second gear and the first gear.

3. The camera rotation mechanism of claim 2, wherein the rotatable carrier comprises a second rotatable shaft connected to the carrier body relative to the first rotatable shaft, the bearing structure comprises a first bearing support and a second bearing support, the first bearing support bears the first rotatable shaft, the second bearing support bears the second rotatable shaft, the first gear is disposed adjacent to the first bearing support, and the second rotatable shaft comprises a protrusive ring adjacent to the second bearing support.

4. The camera rotation mechanism of claim 1, wherein the rotation operation part is fixedly connected to the first rotatable shaft.

5. The camera rotation mechanism of claim 2, wherein the bearing structure comprises a bearing support, the bearing support has an opening portion, a neck portion, and an accommodating portion, and the first rotatable shaft passes the neck portion from the opening portion to be contained in the accommodating portion.

6. The camera rotation mechanism of claim 5, wherein the rotatable carrier comprises a rubber sleeve sleeved on the first rotatable shaft and held in the accommodating portion.

7. The camera rotation mechanism of claim 5, wherein the first rotatable shaft is clamped in the accommodating portion.

8. The camera rotation mechanism of claim 2, further comprising a friction hinge mounted in the casing, wherein the rotatable carrier comprises a second rotatable shaft connected to the carrier body relative to the first rotatable shaft and connected to the friction hinge.

9. The camera rotation mechanism of claim 2, further comprising a friction hinge mounted in the casing, wherein the friction hinge is connected to the first rotatable shaft.

10. The camera rotation mechanism of claim 1, wherein the limit structure has a reverse-V contact surface for stopping the stop surface.

11. A portable electronic apparatus, comprising:
    a casing, having a slot hole and a lens hole;
    a rotatable carrier, disposed in the casing, the rotatable carrier having a carrier body and a first rotatable shaft connected to the carrier body;
    a camera module, disposed on the carrier body, the camera module having a lens, the lens being exposed through the lens hole;
    a bearing structure, mounted in the casing to bear the first rotatable shaft; and
    a rotating mechanism, connected to the first rotatable shaft, the rotating mechanism having a rotation operation part and a limit structure, the rotation operation part being partially exposed through the slot hole and being capable of being rotated to rotate the carrier body through the first rotatable shaft, the rotation operation part having a stop surface, the limit structure being mounted in the casing corresponding to the stop surface for stopping the stop surface to constrain a rotation angle range of the rotation operation part.

12. The portable electronic apparatus of claim 11, wherein the first rotatable shaft comprises a first gear, the rotating mechanism comprises a second gear mounted on the rotation operation part and meshed with the first gear, and the rotation operation part is capable of being rotated to rotate the carrier body through the second gear and the first gear.

13. The portable electronic apparatus of claim 11, wherein the rotation operation part is fixedly connected to the first rotatable shaft.

14. The portable electronic apparatus of claim 12, wherein the bearing structure comprises a bearing support, the bearing support has an opening portion, a neck portion, and an accommodating portion, and the first rotatable shaft passes the neck portion from the opening portion to be contained in the accommodating portion.

15. The portable electronic apparatus of claim 14, wherein the rotatable carrier comprises a rubber sleeve sleeved on the first rotatable shaft and held in the accommodating portion.

16. The portable electronic apparatus of claim 14, wherein the first rotatable shaft is clamped in the accommodating portion.

17. The portable electronic apparatus of claim 12, further comprising a friction hinge mounted in the casing, wherein the rotatable carrier comprises a second rotatable shaft connected to the carrier body relative to the first rotatable shaft and connected to the friction hinge.

18. The portable electronic apparatus of claim 11, wherein the limit structure has a reverse-V contact surface for stopping the stop surface.

19. A camera rotation mechanism, disposed in a casing of an electronic apparatus for rotating a camera module with a lens, the casing having a slot hole and a lens hole, the camera rotation mechanism comprising:
    a rotatable carrier, disposed in the casing, the rotatable carrier having a carrier body and a first rotatable shaft connected to the carrier body, the first rotatable shaft comprising a first gear, the camera module being disposed on the carrier body such that the lens of the camera module is exposed through the lens hole;
    a bearing structure, mounted in the casing to bear the first rotatable shaft; and
    a rotating mechanism, connected to the first rotatable shaft, the rotating mechanism having a rotation operation part and a second gear, the second gear being mounted on the rotation operation part and meshed with the first gear, the rotation operation part being partially exposed through the slot hole and being capable of being rotated to rotate the carrier body through the second gear and the first gear.

20. A portable electronic apparatus, comprising:

a casing, having a slot hole and a lens hole;

a rotatable carrier, disposed in the casing, the rotatable carrier having a carrier body and a first rotatable shaft connected to the carrier body, the first rotatable shaft comprising a first gear;

a camera module, disposed on the carrier body, the camera module having a lens, the lens being exposed through the lens hole;

a bearing structure, mounted in the casing to bear the first rotatable shaft; and a rotating mechanism, connected to the first rotatable shaft, the rotating mechanism having a rotation operation part and a second gear, the second gear being mounted on the rotation operation part and meshed with the first gear, the rotation operation part being partially exposed through the slot hole and being capable of being rotated to rotate the carrier body through the second gear and the first gear.

* * * * *